United States Patent
Yamaguchi et al.

(10) Patent No.: US 8,563,077 B2
(45) Date of Patent: Oct. 22, 2013

(54) METHOD OF MANUFACTURING A GLASS SUBSTRATE FOR A MAGNETIC DISK AND METHOD OF MANUFACTURING A MAGNETIC DISK

(71) Applicant: Hoya Corporation, Tokyo (JP)

(72) Inventors: Tomoyuki Yamaguchi, Tokyo (JP); Kyosuke Iiizumi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/630,899

(22) Filed: Sep. 28, 2012

(65) Prior Publication Data

US 2013/0084386 A1     Apr. 4, 2013

(30) Foreign Application Priority Data

Sep. 30, 2011   (JP) .................................. 2011-217894

(51) Int. Cl.
*B05D 5/12*     (2006.01)
(52) U.S. Cl.
USPC .......................................... 427/129; 510/167

(58) Field of Classification Search
USPC ......... 427/127–132; 510/167; 134/1, 2, 3, 26, 134/28
See application file for complete search history.

(56) References Cited

U.S. PATENT DOCUMENTS

| | | | | |
|---|---|---|---|---|
| 5,997,620 A | * | 12/1999 | Kodama et al. | 106/3 |
| 7,144,489 B1 | * | 12/2006 | Filas | 205/98 |
| 2006/0266732 A1 | * | 11/2006 | Marumo | 216/22 |
| 2013/0012104 A1 | * | 1/2013 | Yamaguchi et al. | 451/41 |

FOREIGN PATENT DOCUMENTS

| | | |
|---|---|---|
| JP | 2009-214219 A | 9/2009 |
| WO | 2011/125894 A1 | 10/2011 |
| WO | WO 2011125894 A1 * | 10/2011 |

* cited by examiner

*Primary Examiner* — Michael Cleveland
*Assistant Examiner* — Sarah R Anderson
(74) *Attorney, Agent, or Firm* — Sughrue Mion, PLLC

(57) ABSTRACT

A method of manufacturing a magnetic disk glass substrate has a cleaning step of cleaning the glass substrate. In the cleaning step, the cleaning is performed under an acidic condition using a cleaning liquid containing oxalate ions and bivalent iron ions. In parallel with the cleaning step or before or after the cleaning step, trivalent iron ions generated by oxidation of the bivalent iron ions contained in the cleaning liquid are reduced by ultraviolet irradiation.

14 Claims, 1 Drawing Sheet

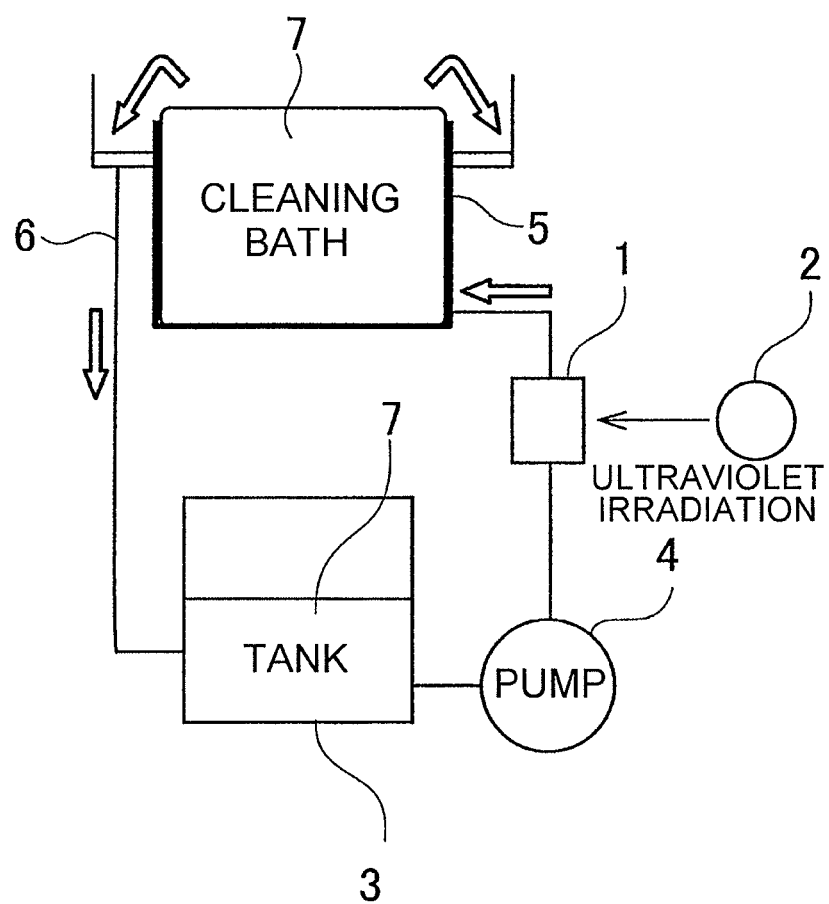

METHOD OF MANUFACTURING A GLASS SUBSTRATE FOR A MAGNETIC DISK AND METHOD OF MANUFACTURING A MAGNETIC DISK

This application is based upon and claims the benefit of priority from Japanese patent application No. 2011-217894, filed on Sep. 30, 2011, the disclosure of which is incorporated herein in its entirety by reference.

TECHNICAL FIELD

This invention relates to a method of manufacturing a glass substrate for a magnetic disk to be used as a recording medium for a computer or the like and to a method of manufacturing a magnetic disk. In the present specification, "a glass substrate for a magnetic disk" may also be referred to as "a magnetic disk glass substrate."

BACKGROUND ART

Following development of information technology, the information recording technique, in particular, the magnetic recording technique has remarkably advanced. In a magnetic disk to be used in a HDD (Hard Disk Drive) or the like, which is known as one of magnetic recording media, rapid improvement has continued towards a smaller size, a reduced thickness, an increased recording density, and a higher access speed. In the HDD, recording and reproducing operations are carried out by rotating, at a high speed, the magnetic disk comprising a disk-shaped substrate and a magnetic layer formed thereon and keeping a magnetic head flying above the magnetic disk.

Following an increase in access speed, the rotation speed of the magnetic disk is increased also. Therefore, the magnetic disk is required to have a higher strength of the substrate. Furthermore, following an increase in recording density, the magnetic head has shifted from a thin film head to a magnetoresistive head (MR head) and then to a giant magnetoresistive head (GMR head) and a flying height of the magnetic head from the magnetic disk has been reduced to about 5 nm. Under the circumstances, if a surface of the magnetic disk has an uneven shape, various defects such as a head crash failure and a thermal asperity failure may be caused to occur. The head crash failure is a failure in which the magnetic head collides with the magnetic disk. The thermal asperity failure is a failure in which a read error occurs due to heating caused by adiabatic compression of air or contact between the magnetic head and the magnetic disk. In order to suppress those failures caused at the magnetic head, it is important to finish a main surface of the magnetic disk into an extremely flat surface.

Under the circumstances, at present, a glass substrate has been increasingly used as a magnetic disk substrate instead of a conventional aluminum substrate. As compared with the aluminum substrate made of a metal as a soft material, the glass substrate made of a glass as a hard material is excellent in flatness of a substrate surface, substrate strength, and rigidity. The glass substrate for use in the magnetic disk is manufactured through grinding and polishing processes of grinding and polishing its main surfaces. The grinding and the polishing processes of the glass substrate may be performed by using a double-side polishing apparatus having a planetary gear mechanism.

As described in JP-A-2009-214219 (Patent Document 1), the planetary gear mechanism has upper and lower surface plates with polishing pads (polishing closes) attached thereto. A glass substrate is sandwiched between the upper and the lower surface plates. While a polishing liquid (slurry) containing abrasive grains suspended therein is supplied between the polishing pads and the glass substrate, the glass substrate is moved relative to the upper and the lower surface plates. Thus, each of the main surfaces of the glass substrate are finished into a flat surface.

In one aspect, the glass substrate is a brittle material. Therefore, in a manufacturing process of a magnetic disk glass substrate, the glass substrate is dipped into a heated chemical strengthening liquid so that lithium ions and sodium ions in a surface layer of the glass substrate are replaced or ion-exchanged by sodium ions and potassium ions in the chemical strengthening solution, respectively. Thus, a compressive stress layer is formed in the surface layer of the glass substrate to strengthen the glass substrate (glass strengthening step).

In the manufacturing process of the magnetic disk glass substrate, in addition to flattening by the grinding and the polishing processes, it is also an important problem to remove even a little contamination on the surface of the glass substrate so as to keep the surface of the glass substrate clean. It is known that, in order to keep the substrate surface finally clean, the glass substrate is cleaned under an acidic condition after each of the grinding and the polishing processes.

Then, on the magnetic disk glass substrate with its surface flattened by the grinding and the polishing processes, a thin film (magnetic layer) having a thickness on the order of several nanometers is formed and then a recording/reproducing track is formed.

SUMMARY OF THE INVENTION

In a manufacturing apparatus used in the manufacturing process of the magnetic disk glass substrate, a stainless-steel member may be used in a grinding apparatus and a polishing apparatus. In a chemical strengthening step also, a stainless-steel material may be used. In case where a step using an apparatus made of stainless steel is carried out, metal contaminants (in particular, iron-based foreign matters) derived from stainless steel may be generated from the apparatus and adhered to the glass substrate. Furthermore, an indirect material used in each step, for example, abrasive grains used in the grinding apparatus and the polishing apparatus, may contain metal contaminants.

Among various contaminations affecting the glass substrate, in particular, contaminations by adhesion of metal-based fine particles cause unevenness on the surface after formation of the magnetic layer. This results in degradation of electric characteristics, such as recording and reproducing characteristics, of products and decrease in yield of the products. In view of the above, in the manufacturing process of the magnetic disk glass substrate, such contaminations must be removed. In particular, considering that the flying height of the magnetic head from the magnetic disk is reduced following the improvement in recording density, it is necessary to consider those contaminants derived from the material of each apparatus.

However, the metal contaminants derived from stainless steel are hardly corroded and, therefore, hardly removed by an acidic aqueous solution or an alkali aqueous solution generally used in a cleaning step. In order to remove the metal contaminants, it is necessary to use an acidic solution having strong reactivity (for example, hydrofluoric acid).

On the other hand, in case where the acidic solution having strong reactivity is used as a cleaning liquid, the surface of the glass substrate is also affected and its surface roughness is disadvantageously increased. Therefore, in order to further improve smoothness and cleanness of the surface of the glass substrate, it is desired to perform a cleaning process using a cleaning liquid which is capable of effectively removing metal contaminants firmly adhered to the glass substrate and which does not affect the glass substrate.

In recent years, in order to further improve the recording density, development has been made of an HDD having a head which incorporates DFH (Dynamic Flying Height) technology, i.e., a DFH head. By this technology, it is possible to bring a head device portion closer to a medium surface than before so as to reduce a magnetic spacing. On the other hand, it has been found that, in case where the DFH head is used, the main surface of the magnetic disk must be smoother than before and must be clean with less defects such as foreign matters. In the DFH head, only a part around the head device portion is protruded to be close to the medium surface without reducing a flying height of a head body to bring the head body close to the surface of the magnetic disk. Therefore, even a little disturbance of surface unevenness or contact with foreign matters may affect the head device portion.

For example, in order to achieve the recording density of 500 GB or more per a 2.5-inch magnetic disk, the distance between the protruding head device portion and the magnetic disk must be reduced to preferably 1 nm or less.

In view of the above-mentioned situation, this invention has been proposed. It is an object of this invention to provide a method of manufacturing a magnetic disk glass substrate, which is capable of effectively removing metal contaminants adhered to a surface of a glass substrate while suppressing an increase in roughness of the surface of the glass substrate and to provide a method of manufacturing a magnetic disk by using the magnetic disk glass substrate.

In order to solve the above-mentioned problem and to achieve the above-mentioned object, a method of manufacturing a magnetic disk glass substrate according to this invention has any one of the following structures.

(Structure 1)

A method of manufacturing a magnetic disk glass substrate, comprising:

a polishing step of polishing a main surface of a glass substrate; and a cleaning step of cleaning the glass substrate after the polishing step, wherein:

in the cleaning step, the cleaning is performed under an acidic condition using a cleaning liquid containing oxalate ions and bivalent iron ions, the cleaning step including an operation of reducing the cleaning liquid.

(Structure 2)

The method according to structure 1, wherein the operation of reducing the cleaning liquid is light irradiation of the cleaning liquid.

As a method (operation) of reducing the cleaning liquid, use may be made of a method of adding a reducing agent such as an ascorbic acid.

(Structure 3)

A method of manufacturing a magnetic disk glass substrate, comprising:

a polishing step of polishing a main surface of a glass substrate; and a cleaning step of cleaning the glass substrate after the polishing step, wherein:

in the cleaning step, the cleaning is performed under an acidic condition using a cleaning liquid containing oxalate ions and bivalent iron ions, the cleaning liquid being subjected to light irradiation in parallel with the cleaning step or before the cleaning step or after the cleaning step.

(Structure 4)

The method according to structure 3, wherein light for irradiation of the cleaning liquid is an ultraviolet ray or a visible light.

(Structure 5)

The method according to structure 4, wherein the ultraviolet ray or the visible light has a wavelength in a range between 300 nm and 450 nm.

(Structure 6)

A method of manufacturing a magnetic disk glass substrate, comprising:

a polishing step of polishing a main surface of a glass substrate; and a cleaning step of cleaning the glass substrate after the polishing step, wherein:

in the cleaning step, the cleaning is performed under an acidic condition using a cleaning liquid containing oxalate ions and bivalent iron ions, in parallel with the cleaning step or before the cleaning step or after the cleaning step, trivalent iron ions generated by oxidation of the bivalent iron ions contained in the cleaning liquid are reduced.

(Structure 7)

The method according to any one of structures 1 to 6, wherein the polishing step is carried out by using a polishing apparatus having a polishing surface plate containing iron, and the cleaning step dissolves iron-based foreign matters.

(Structure 8)

The method according to any one of structures 1 to 7, wherein the cleaning liquid further contains an organic acid having a carboxyl group.

(Structure 9)

The method according to structure 8, wherein the organic acid is a carboxylic acid having a molecular weight greater than a molecular weight of an oxalic acid.

(Structure 10)

The method according to any one of structures 1 to 9, wherein the cleaning liquid has a pH not smaller than 1.8 and not greater than 4.2.

(Structure 11)

The method according to any one of structures 1 to 10, wherein a concentration of an oxalic acid in the cleaning liquid is not smaller than 0.015 mol/L and not greater than 0.24 mol/L.

(Structure 12)

The method according to any one of structures 1 to 11, wherein the bivalent iron ions contained in the cleaning liquid are supplied from at least one of ammonium iron (II) sulfate, iron (II) sulfate, and iron (II) oxalate as a bivalent ion supplying substance, and a concentration of ammonium iron (II) sulfate in the cleaning liquid is not smaller than 0.00038 mol/L and not greater than 0.0077 mol/L when the bivalent ion supplying substance is ammonium iron (II) sulfate.

(Structure 13)

The method according to any one of structures 1 to 12, wherein the glass substrate after the cleaning step has a surface roughness of 0.2 nm or less.

A method of manufacturing a magnetic disk according to this invention has the following structure.

(Structure 14)

A method of manufacturing a magnetic disk, comprising:

forming at least a magnetic layer on the main surface of the magnetic disk glass substrate obtained by the method according to any one of structures 1 to 13.

In the method of manufacturing a magnetic disk glass substrate according to this invention, in the cleaning step, cleaning is performed under an acidic condition using a cleaning liquid containing oxalate ions and bivalent iron ions. The cleaning step includes an operation of reducing the cleaning liquid. Therefore, the cleaning liquid deteriorated (oxidized) by air oxidation is regenerated by photoreduction. Thus, it is possible to effectively remove metal contaminants adhered to the surface of the glass substrate while suppressing an increase in roughness of the surface of the glass substrate. An operation of reducing trivalent iron ions generated as a result of oxidation of the bivalent iron ions contained in the cleaning liquid may be carried out in parallel with the cleaning step or before or after the cleaning step.

Thus, in this invention, the cleaning liquid deteriorated (oxidized) by air oxidation is regenerated by photoreduction. Therefore, it is possible to provide a method of manufacturing a magnetic disk glass substrate, which is capable of effectively removing metal contaminants adhered to a surface of a glass substrate while suppressing an increase in roughness of the surface of the glass substrate and to provide a method of manufacturing a magnetic disk by using the magnetic disk glass substrate.

BRIEF DESCRIPTION OF THE DRAWING

FIG. 1 is a schematic view showing a structure of a cleaning apparatus (a cleaning bath) used in a method of manufacturing a magnetic disk glass substrate according to this invention.

DESCRIPTION OF THE EXEMPLARY EMBODIMENTS

Now, description will be made of embodiments of this invention.

[Embodiment of Method of Manufacturing a Magnetic Disk Glass Substrate]

In order to further improve smoothness and cleanness of a magnetic disk glass substrate, the present inventors conducted the study. Then, the present inventors encountered a problem that metal contaminants (for example, iron-based foreign matters) derived from a material of a manufacturing apparatus for a magnetic disk glass substrate and from an indirect material used in various steps are adhered to the glass substrate and cannot sufficiently be removed by an ordinary cleaning process.

In particular, in case where a polishing step of polishing a main surface of the glass substrate is performed by using a polishing apparatus having a polishing surface plate containing iron, it is highly possible that iron-based foreign matters are present on the glass substrate. Therefore, in a cleaning step, the iron-based foreign matters must be removed.

In view of the above, the present inventors have thoroughly and intensely studied about a method of removing the metal contaminants derived from stainless steel while suppressing an increase in surface roughness of the glass substrate. As a result, it has been found that, by using a cleaning liquid containing an oxalic acid and bivalent iron ions ($Fe^{2+}$) added thereto, the metal contaminants (in particular, iron-based foreign matters) can effectively be removed while suppressing an influence on the surface of the glass substrate. Hereinafter, description will be made of a specific example of the method of manufacturing a magnetic disk glass substrate.

The method of manufacturing a magnetic disk glass substrate according to this embodiment is characterized by comprising a cleaning step of cleaning the glass substrate under an acidic condition using a cleaning liquid containing oxalate ions and bivalent iron ions. Furthermore, the method according to this invention is characterized in that, in parallel with the cleaning step or before or after the cleaning step, trivalent iron ions ($Fe^{3+}$) generated as a result of oxidation of the bivalent iron ions contained in the cleaning liquid are reduced thereby preventing deterioration in cleaning ability or power of the cleaning liquid.

The cleaning liquid may be obtained by adding, to an oxalic acid aqueous solution, a substance capable of supplying bivalent iron ions. As the substance capable of supplying bivalent iron ions, use may be made of one or more of ammonium iron(II) sulfate, iron(II) sulfate, and iron(II) oxalate. Among others, ammonium iron(II) sulfate is preferable because of high chemical stability.

The cleaning liquid has a pH adjusted to be in a range not smaller than 1.8 and not greater than 4.2, preferably not smaller than 2 and not greater than 4. If the pH is smaller than 1.8, the roughness of the glass substrate may possibly be increased. If the pH exceeds 4.2, the foreign matters on the glass substrate cannot effectively be removed. Adjustment of the pH may be performed by using an acid such as a sulfuric acid or an alkali such as potassium hydroxide (KOH) or sodium hydroxide (NaOH).

In the cleaning liquid, the concentration of the oxalic acid is preferably in a range not smaller than 0.015 mol/L and not greater than 0.24 mol/L. If the concentration of the oxalic acid is smaller than 0.015 mol/L, the effect of removing iron oxide particles is insufficient. If the concentration exceeds 0.24 mol/L, the effect is no longer changed. As a matter of course, the concentration exceeding 0.24 mol/L is allowable. Herein, the concentration of the oxalic acid is a value including dissociated oxalate ions. The concentration of the oxalic acid can be confirmed by analyzing a sampled cleaning liquid by liquid chromatography.

In case where the cleaning liquid comprises the oxalic acid and ammonium iron(II) sulfate added thereto, the concentration of ammonium iron(II) sulfate is preferably in a range not smaller than 0.00038 mol/L and not greater than 0.0077 mol/L. If the concentration of ammonium iron(II) sulfate is smaller than 0.00038 mol/L, the foreign matters on the glass substrate cannot effectively be removed. If the concentration exceeds 0.0077 mol/L, no further improved effect is obtained. As a matter of course, the concentration exceeding 0.0077 mol/L is allowable. The concentration of iron ions can be confirmed by analyzing a sampled cleaning liquid by ICP (Inductively Coupled Plasma) analysis.

The bivalent iron ions contained in the cleaning liquid are changed into trivalent iron ions mainly by oxidation due to air. The trivalent iron ions form a complex with an organic acid in the cleaning liquid. When the complex is irradiated with ultraviolet ray, the complex absorbs the ray to cause photoreduction. As a consequence, the trivalent iron ions are changed into bivalent iron ions. By the photoreduction, the cleaning liquid deteriorated by air oxidation is regenerated. By regenerating the cleaning liquid, it is possible to stably obtain a high cleaning effect over a long period of time and to reduce the frequency of exchange of the cleaning liquid.

When the photoreduction is carried out, the organic acid is decomposed. Then, the oxalic acid is decreased so that degradation in cleaning effect or variation in pH may be caused to occur. In view of the above, at least one carboxylic acid (organic acid having a carboxyl group) selected from a group including a malic acid, a tartaric acid, a gluconic acid, and a citric acid, is preferably added as an auxiliary organic acid to the cleaning liquid. By such organic acid, it is possible to suppress a decrease of the oxalic acid due to photoreduction.

As the auxiliary organic acid, a carboxylic acid having a molecular weight greater than that of the oxalic acid is preferable. In this case, it is possible to effectively suppress decomposition of the oxalic acid. Among others, a malic acid, a tartaric acid, a gluconic acid, and a citric acid are preferable because pH change in the cleaning liquid is relatively small when such acid is added to the cleaning liquid.

In this case, the complex of the organic acid and the trivalent iron ions absorbs the ultraviolet ray to generate bivalent iron ions and carbon dioxide as follows.

$$Fe^{3+}+[\text{carboxylic acid}]\text{->}(+h\nu)\text{->}Fe^{2+}+CO_2$$

As the oxalic acid has small molecules, $CO_2$ is directly generated.

$$2[Fe^{3+}(C_2O_4)_3]^{3-}\text{->}(+h\nu)\text{->}2[Fe^{2+}(C_2O_4)_3]+3C_2O_4^{2-}+2CO_2$$

By an increase of such organic acid, a pH buffering effect is obtained also. Even if the organic acid is decomposed due to photoreduction, the pH can be stabilized.

Irradiation light for photoreduction preferably has a wavelength between 300 nm and 450 nm. The wavelength shorter than 300 nm is not preferable because not only the complex but also the organic acid as a single substance absorbs the ultraviolet ray so that decomposition is intensely performed. The wavelength longer than 450 nm is not preferable because the light is hardly absorbed by the complex and photoreduction hardly occurs.

FIG. 1 is a schematic view showing a structure of a cleaning apparatus (a cleaning bath) used in the method of manufacturing a magnetic disk glass substrate according to this invention.

Ultraviolet irradiation is carried out as follows. As shown in FIG. 1, a cleaning liquid 7 passes through a quartz pass-through portion 1 where the cleaning liquid 7 is irradiated with ultraviolet ray emitted from an ultraviolet lamp 2 outside the quartz pass-through portion 1. Specifically, in the cleaning step, the cleaning liquid 7 stored in a tank 3 is supplied by a pump 4 through the quartz pass-through portion 1 to a cleaning bath 5. The quartz pass-through portion 1 comprises a transparent narrow tube which allows the cleaning liquid 7 to pass through its inside. In the quartz pass-through portion 1, the cleaning liquid 7 is irradiated with the ultraviolet ray emitted from the ultraviolet lamp 2. In the cleaning bath 5, a magnetic disk glass substrate is dipped in the cleaning liquid 7 to be cleaned. The cleaning liquid 7 in the cleaning bath 5 overflows from the cleaning bath 5 and returns through a recovery pipe 6 to the tank 3. Thus, the cleaning liquid 7 circulates through the tank 3 and the cleaning bath 5. During the circulation, the cleaning liquid 7 is irradiated with the ultraviolet ray at the quartz pass-through portion 1.

As a temperature of the cleaning liquid is higher, a dissolving effect is increased. However, the temperature is too high, there arises a problem of increase in surface roughness of the glass substrate and another problem that the substrate is dried during transfer. Therefore, the temperature of the cleaning liquid is preferably within a range from the room temperature to 60° C.

In the cleaning liquid, bivalent iron ions ($Fe^{2+}$) are changed into trivalent iron ions ($Fe^{3+}$) so that the bivalent iron ions are reduced while the trivalent iron ions are increased. This is mainly attributed to air oxidation. Due to dissolution of iron-based foreign matters ($Fe^{3+}$) by the cleaning liquid, the ratio ($Fe^{2+}/Fe^{3+}$) of the bivalent iron ions and trivalent iron ions is slightly changed but this change is negligible. Specifically, in dissolution of the iron-based foreign matters, complex ions of the bivalent iron ions donating electrons to the iron-based foreign matters are changed into the trivalent iron ions. Simultaneously, however, the iron-based foreign matters are dissolved as the bivalent iron ions. Therefore, the amount of the bivalent iron ions in the cleaning liquid is not changed. The trivalent iron ions in the cleaning liquid are increased corresponding to the amount of the iron-based foreign matters. However, the amount of the iron-based foreign matters is small and does not contribute to the increase of the trivalent iron ions.

[Other Embodiments]

In the method of manufacturing a magnetic disk glass substrate according to this invention, ultraviolet ray irradiation to the cleaning liquid may be carried out in the following manner. In the cleaning bath or in the tank, an ultraviolet lamp is disposed in the cleaning liquid. By the ultraviolet lamp, the cleaning liquid around the ultraviolet lamp is irradiated with ultraviolet ray.

In the cleaning bath, air and chemical solution (cleaning liquid) are contacted to each other at an upper part of the cleaning bath (surface of the cleaning liquid) and at a part where the cleaning liquid overflows from the cleaning bath and flows into the recovery pipe. By nitrogen ($N_2$) purging at these parts, oxidation of the cleaning liquid can be prevented. Also by blowing an $N_2$ gas into any of these parts, it is possible to help reduction by ultraviolet irradiation and to prevent oxidation of the cleaning liquid.

[Mechanism of Cleaning]

Now, description will be made of a mechanism of removing the iron-based foreign matters adhered to the glass substrate by using the cleaning liquid containing an oxalic acid aqueous solution and bivalent iron ions added thereto.

At first referring to Equation Set 1, description will be made of the case where an oxalic acid without bivalent iron ions added thereto is used as the cleaning liquid. Generally, iron-based foreign matters adhered to the glass substrate includes iron oxide having an oxidation number 2 and iron oxide having an oxidation number 3. Therefore, consideration will be made of removal of the iron oxides having oxidation numbers 2 and 3.

[Equation Set 1]

Cleaning Liquid $$H_2C_2O_4 \Leftrightarrow C_2O_4^{2-} + 2H^+ \quad (1)$$

Iron (II) Oxide $$\underset{(s)II}{Fe}\text{-}O + H^+ \Leftrightarrow \underset{(s)II}{Fe}\text{-}OH^+ \quad (2)$$

$$\underset{(s)II}{Fe}\text{-}OH^+ + C_2O_4^{2-} \Leftrightarrow \left[\underset{(s)II}{Fe}\text{-}C_2O_4\right]^- + H_2O \quad (3)$$

$$\left[\underset{(s)II}{Fe}\text{-}C_2O_4\right]^- \xrightarrow{dissolution} \left[\underset{(aq)}{Fe^{2+}}\text{-}C_2O_4\right] \rightarrow \left[\underset{(aq)}{Fe^{2+}}\text{-}(C_2O_4)_3\right]^{4-} \quad (4)$$

Iron (III) Oxide $$\underset{(s)III}{Fe}\text{-}O + H^+ \Leftrightarrow \underset{(s)III}{Fe}\text{-}OH^+ \quad (5)$$

$$\underset{(s)III}{Fe}\text{-}OH^+ + C_2O_4^{2-} \Leftrightarrow \left[\underset{(s)III}{Fe}\text{-}C_2O_4\right]^- \quad (6)$$

-continued

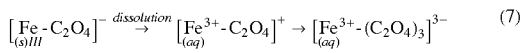
(7)

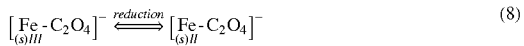
(8)

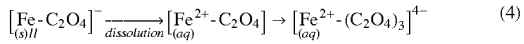
(4)

When the oxalic acid is used as the cleaning liquid, the reaction of iron (II) oxide (oxidation number 2) is as shown by Equations (2) to (4) in Equation Set 1. The reactions (3) and (4) relatively quickly proceed even in the oxalic acid aqueous solution. Therefore, iron oxide foreign matters having the oxidation number 2 can be removed by using the oxalic acid aqueous solution.

When the oxalic acid is used as the cleaning liquid, the reaction of iron oxide having the oxidation number 3 is as shown by Equations (5) to (8) and (4) in Equation Set 1. Herein, the reactions (7) and (8) are slow in the oxalic acid aqueous solution. In order to increase the reaction speed, high-temperature and highly-acidic conditions are required. Therefore, the surface roughness is inevitably increased. Thus, with the oxalic acid aqueous solution, it is difficult to remove the iron oxide foreign matters having the oxidation number 3. Generally, most of the iron oxide foreign matters exist in the form of the iron oxide having the oxidation number 3. Therefore, cleaning is insufficient by the use of the oxalic acid aqueous solution alone.

Next referring to Equation Set 2, description will be made of the case where the oxalic acid with bivalent iron ions added thereto is used as the cleaning liquid.

[Equation Set 2]

Cleaning Liquid $$H_2C_2O_4 \Leftrightarrow C_2O_4^{2-} + 2H^+ \quad (1)$$

(9)

Iron (III) Oxide

(5)

(6)

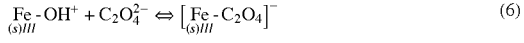
(10)

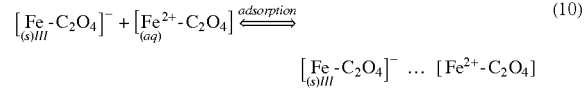
(11)

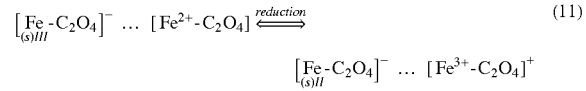
(12)

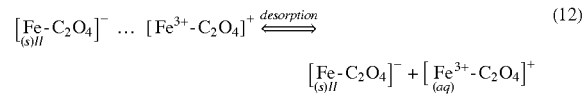
(4)

When bivalent iron ions are added to the oxalic acid, a complex is formed. Then, the bivalent iron ion complex is effectively adsorbed to the surface of the iron oxide foreign matters having the oxidation number 3 to cause a reduction reaction and a dissolution reaction of the iron (III) oxide can effectively proceed ((10) to (12), (4) in Equation Set 2). The reactions (10) to (12) in Equation Set 2 are caused by supplying the bivalent iron ions to the oxalic acid aqueous solution. In detail, solid Fe(II) in Equation (12) disappears by the reaction (4). Therefore, in order to maintain the equilibrium, rightward reactions are promoted in the three chemical equations (10) to (12). Accordingly, solid Fe(III) at a starting point is dissolved to disappear. Thus, by supplying the bivalent iron ions to the oxalic acid aqueous solution, the dissolution reaction of the iron oxide foreign matters having the oxidation number 3 can effectively proceed.

Thus, by using, as the cleaning liquid, the oxalic acid aqueous solution obtained by adding the bivalent iron ions to the oxalic acid, it is possible to effectively remove the iron-oxide foreign matters (in particular, iron oxide having the oxidation number 3) adhered to the glass substrate.

As described above, the pH of the cleaning liquid is preferably adjusted to a range not smaller than 1.8 and not greater than 4.2, preferably not smaller than 2 and not greater than 4. If the pH is lower than 1.8, the amount of the complex of the bivalent iron ions and the oxalate ions is reduced so that the frequency of occurrence of the dissolution reaction comprising (10) to (12) and (4) is reduced. If the pH is greater than 4.2, the above-mentioned reactions (2) and (6) are inhibited.

After the cleaning step, a second cleaning step using an alkali aqueous solution may be carried out. Since the above-mentioned cleaning step is acidic cleaning, a heterogeneous layer (modified layer) may be produced on the surface of the glass substrate (in particular, when the cleaning step is performed under a highly acidic condition). In this event, by carrying out the second cleaning step using an alkali aqueous solution or water rinsing, the heterogeneous layer can be removed. Furthermore, by carrying out the second cleaning step using an alkali aqueous solution or water rinsing, it is possible to completely remove a residue of oxalate ions on the surface of the glass substrate. Accordingly, it is possible to completely prevent corrosion due to an acid left on the surface of the glass substrate after cleaning. In the second cleaning step, ultrasonic treatment may be applied.

[Steps of Method of Manufacturing a Magnetic Disk Glass Substrate]

Hereinafter, description will be made of each step of the manufacturing process of the magnetic disk substrate. The order of the steps may appropriately be changed.

(1) Material Processing Step and First Lapping Step

At first, in a material processing step, a plate glass may be used. The plate glass may be manufactured, for example, by a known manufacturing method, such as a pressing method, a float method, a downdraw method, a redrawing method, or a fusion method, using a molten glass as a material. If the pressing method is used among these methods, the plate glass can be manufactured at a low cost.

In a first lapping step, both main surfaces of a disk-shaped glass are lapped to mainly adjust the flatness and the thickness of the glass substrate. The lapping may be carried out by a double-side lapping apparatus having a planetary gear mechanism, using alumina-based free abrasive grains. Specifically, lapping surface plates are pressed against the both main surfaces of the disk-shaped glass from upside and downside. A grinding liquid containing the free abrasive grains are supplied onto the main surfaces of the disk-shaped glass. The surface plates and the glass are relatively moved with respect to each other. Thus, lapping is performed. The lapping surface plates may be made of an iron-based material. By the lapping, a glass substrate having flat main surfaces can be obtained.

(2) Shaping Step (Coring Step of Forming a Bore, Chamfering Step of Forming a Chamfered Surface at End Portions (Outer and Inner Peripheral End Portions) (Chamfered Surface Forming Step))

In a coring step, an inner bore is formed at the center of the glass substrate, for example, by using a cylindrical diamond drill, to obtain a ring-shaped glass substrate. In a chamfering step, inner and outer peripheral end faces of the glass substrate are ground by a diamond grindstone and subjected to predetermined chamfering.

(3) Second Lapping Step

In a second lapping step, the both main surfaces of the glass substrate obtained as mentioned above are subjected to second lapping in the manner similar to the first lapping step. By the second lapping step, it is possible to preliminarily remove fine unevenness formed on the main surfaces, for example, in the shaping step as a preceding step. Therefore, a polishing step for the main surfaces as a subsequent step can be finished in a short time.

(4) End Face Polishing Step

In an end face polishing step, the outer and the inner peripheral end faces of the glass substrate are mirror-polished by a brush polishing method. As polishing abrasive grains, for example, a slurry (free abrasive grains) containing cerium oxide abrasive gains may be used. By the end face polishing step, the end faces of the glass substrate are put into a mirror-surface condition capable of preventing occurrence of deposition of sodium and potassium and of suppressing generation of particles causing thermal asperity or the like and adhesion of the particles to the end faces.

(5) Main Surface Polishing Step (First Polishing Step)

As a main surface polishing step, a first polishing step is at first carried out. The first polishing step mainly aims to remove cracks or strains left on the both main surfaces in the above-mentioned lapping step. In the first polishing step, the both main surfaces are polished by a double-side polishing apparatus having a planetary gear mechanism, using a hard resin polisher. As a polishing agent, cerium oxide abrasive grains may be used. The glass substrate after the first polishing step is cleaned by a neutral detergent, pure water, IPA, and the like.

(6) Chemical Strengthening Step

In a chemical strengthening step, the glass substrate after the lapping step and the polishing step is chemically strengthened. As a chemical strengthening liquid (molten salt) used in chemical strengthening, for example, use may be made of a molten salt of a mixture (mixed solution) of potassium nitrate (60%) and sodium nitrate (40%). In the chemical strengthening, the chemical strengthening liquid is heated to 300° C.-400° C. The glass substrate after cleaning is preheated to 200° C.-300° C. and dipped in the chemical strengthening liquid for 3 to 4 hours. Preferably, the dipping is performed in a state where a plurality of glass substrates are placed in a holder so as to be held at their end faces in order that the both main surfaces of the glass substrates are chemically strengthened entirely.

By dipping the glass substrate in the chemical strengthening liquid as described above, lithium ions and sodium ions in a surface layer of the glass substrate are replaced by sodium ions and potassium ions contained in the chemical strengthening liquid and having relatively large ion radii, respectively. Thus, the glass substrate is strengthened. The chemically strengthened glass substrate is cleaned with sulfuric acid and then cleaned with pure water or the like.

(7) Main Surface Polishing Step (Final Polishing Step)

Next, as a final polishing step, a second polishing step is performed. The second polishing step aims to finish the both main surfaces into a mirror-surface condition. In the second polishing step, the both main surfaces are mirror-polished by a double-side polishing apparatus having a planetary gear mechanism and polishing surface plates containing iron, using a foamable soft resin polisher. As a slurry, use may be made of fine cerium oxide abrasive gains or colloidal silica abrasive grains which are finer than the cerium oxide abrasive grains used in the first polishing step.

(8) Cleaning Step

After the chemical strengthening step, the glass substrate is subjected to a cleaning step. The cleaning step aims to remove particles adhered to the surfaces of the glass substrate after the chemical strengthening step.

As the cleaning step, a cleaning step is performed which has an operation of contacting the glass substrate with a cleaning liquid containing an oxalic acid and bivalent iron ions and having a pH not smaller than 1.8 and not greater than 4.2, preferably not smaller than 2 and not greater than 4 (an optimum value exhibiting a largest dissolution effect is pH3). Specifically, as a cleaning liquid, a substance supplying bivalent iron ions is added to the oxalic acid. For example, the substance may be ammonium iron (II) sulfate, iron (II) sulfate, or iron (II) oxalate. Preferably, a carboxylic acid (organic acid having a carboxyl group), such as a malic acid, a tartaric acid, a gluconic acid, and a citric acid, is preferably added to the cleaning liquid as an auxiliary organic acid.

For example, in case where ammonium iron (II) sulfate and the malic acid are added to the oxalic acid to obtain the cleaning liquid, it is preferable that the concentration of the oxalic acid is adjusted to a range not smaller than 0.015 mol/L and not greater than 0.24 mol/L (typically, 0.022 mol/L) and the concentration of ammonium iron (II) sulfate is adjusted to a range not smaller than 0.00038 mol/L and not greater than 0.0077 mol/L so that the concentration of the bivalent iron ions is typically 0.00078 mol/L. Preferably, the concentration of the malic acid is in a range not smaller than 0.007 mol/L and not greater than 0.4 mol/L, typically 0.040 mol/L.

In parallel with the cleaning step or before or after the cleaning step, trivalent iron ions ($Fe^{3+}$) generated by oxidation of the bivalent iron ions contained in the cleaning liquid are reduced by ultraviolet irradiation. Typically, the wavelength of the ultraviolet ray is 365 nm.

By the above-mentioned cleaning operation, the iron-based foreign matters which are derived from the material (stainless steel or the like) of the apparatus or the indirect material and which are adhered to the surface of the glass substrate can effectively be removed while suppressing an increase in roughness of the surface of the glass substrate. Even if the iron-based foreign matters adhered before and during the chemical strengthening step are firmly adhered to the glass substrate by the chemical strengthening step so as not to be removed by a physical removing technique using scrub cleaning or the like, the iron-based foreign matters can effectively be removed by the cleaning operation. In particular, in case where the apparatus used in the chemical strengthening step contains a stainless steel material, the above-mentioned cleaning operation is effective. As the cleaning step, another cleaning operation may be combined in addition to the above-mentioned cleaning operation. For example, in combination with alkali cleaning, a removing effect for other contaminants is obtained to improve a total cleaning ability or detergency.

Herein, description has been made of the structure that the cleaning step using the cleaning liquid containing the oxalic acid and the bivalent iron ions added thereto is performed after the chemical strengthening step. Alternatively, the cleaning step may be carried out before the chemical strengthening step or before and after the chemical strengthening step. For example, the cleaning operation using the above-mentioned cleaning liquid may be carried out after the first lapping step and/or the second lapping step.

(9) Magnetic Disk Manufacturing Step (Recording Layer Forming Step)

On the main surface of the glass substrate obtained through the above-mentioned steps, for example, an adhesion layer, a soft magnetic layer, a nonmagnetic under layer, a perpendicular magnetic recording layer, a protection layer, and a lubrication layer are successively formed. Thus, a perpendicular magnetic recording disk is manufactured. As a material of the adhesion layer, a Cr alloy or the like may be used. As a material of the soft magnetic layer, a CoTaZr-based alloy or the like may be used. The nonmagnetic under layer may be a granular nonmagnetic layer or the like. The perpendicular magnetic recording layer may be a CoPt granular magnetic layer. As a material of the protection layer, hydrogenated carbon or the like may be used. As a material of the lubrication layer, fluororesin or the like may be used.

For example, the recording layer and the other layers are formed in the following manner. Specifically, on the glass substrate, the CrTi adhesion layer, the CoTaZr/Ru/CoTaZr soft magnetic layer, the $CoCrSiO_2$ nonmagnetic granular under layer, the CoCrPt—$SiO_2$.$TiO_2$ granular magnetic layer, and the hydrogenated carbon protection layer are successively formed by using an inline sputtering apparatus. Then, the perfluoropolyether lubrication layer is formed by dipping.

Instead of the $CoCrSiO_2$ nonmagnetic granular under layer, an Ru under layer may be used. Furthermore, a NiW seed layer may be added between the soft magnetic layer and the under layer. Between the granular magnetic layer and the protection layer, a CoCrPtB magnetic layer may be added.

EXAMPLES

Next, description will be made of specific examples carried out in order to clarify the effect of this invention.

(1) Material Processing Step

Aluminosilicate glass in a molten state was molded into a disk shape by direct pressing using an upper die, a lower die, and a body die to obtain an amorphous plate glass. As the aluminosilicate glass, use was made of a glass containing 58 to 75 wt % $SiO_2$, 5 to 23 wt % $Al_2O_3$, 0 to 10 wt % $Li_2O$, 4 to 13 wt % $Na_2O$ as main components. The content of $Li_2O$ may be greater than 0 wt % and not greater than 7 wt %.

(2) First Grinding (Lapping) Step

Next, both main surfaces of the disk-shaped glass substrate were lapped. The lapping was carried out by a double-side lapping apparatus having a planetary gear mechanism, using alumina-based free abrasive grains. Specifically, surface plates were pressed against the both main surfaces of the glass substrate from upside and downside. A grinding liquid containing the free abrasive grains was supplied onto the main surfaces of the glass substrate. The surface plates and the glass substrate were relatively moved with respect to each other. Thus, the lapping was performed. By the lapping, a glass substrate having flat main surfaces was obtained.

(3) Shaping Step (Coring, Chamfering)

Next, an inner bore was formed at the center of the glass substrate by using a cylindrical diamond drill to obtain a ring-shaped glass substrate (coring). Then, inner and outer peripheral end faces of the glass substrate were ground by a diamond grindstone and subjected to predetermined chamfering (chamfering).

(4) Second Lapping Step

Next, the both main surfaces of the glass substrate thus obtained were subjected to a second lapping step in the manner similar to the first lapping step. By the second lapping step, it is possible to preliminarily remove fine unevenness formed on the main surfaces in a cutting step or an end face polishing step as a preceding step. Therefore, a subsequent polishing step for the main surfaces can be finished in a short time.

(5) End Face Polishing Step

Next, the outer and the inner peripheral end faces of the glass substrate were mirror-polished by a brush polishing method. As polishing abrasive grains, a slurry containing cerium oxide abrasive grains (free abrasive grains) was used. The glass substrate after the end face polishing step was cleaned with water. By the end face polishing step, the end faces of the glass substrate were put into a mirror-surface condition capable of preventing occurrence of deposition of sodium and potassium.

(6) Main Surface Polishing Step (First Polishing Step)

As a main surface polishing step, a first polishing step was at first carried out. The first polishing step mainly aims to remove cracks or strains left on the both main surfaces in the above-mentioned lapping step. In the first polishing step, the both main surfaces were polished by a double-side polishing apparatus having a planetary gear mechanism, using a hard resin polisher. As a polishing agent, cerium oxide abrasive grains were used.

The glass substrate after the first polishing step was successively dipped in respective cleaning baths of a neutral detergent, pure water, and IPA (isopropyl alcohol) to be cleaned.

(7) Chemical Strengthening Step

Next, the glass substrate after the main surface polishing step was subjected to chemical strengthening (ion exchange). The chemical strengthening was performed by preparing a chemical strengthening liquid comprising a mixture of potassium nitrate (60%) and sodium nitrate (40%), heating the chemical strengthening liquid to 400° C., preheating the glass substrate after cleaning to 300° C., and dipping the glass substrate in the chemical strengthening liquid for 3 hours. The dipping was performed in a state where a plurality of glass substrates were placed in a holder so as to be held at their end faces in order that the entire surfaces of the glass substrates were chemically strengthened entirely.

By dipping the glass substrate in the chemical strengthening liquid as described above, lithium ions and sodium ions in a surface layer of the glass substrate were replaced by sodium ions and potassium ions contained in the chemical strengthening liquid, respectively. Thus, the glass substrate was strengthened.

(8) Main Surface Polishing Step (Final Polishing Step)

Next, as a main surface polishing step, a second polishing step was performed. The second polishing step aims to finish the both main surfaces of the glass substrates into a mirror-surface condition by polishing a compressive stress layer formed on the glass substrate so as to reduce a predetermined thickness. In this example, the both main surfaces were mirror-polished by a double-side polishing apparatus having a planetary gear mechanism, using a foamable soft resin polisher. As a polishing agent, use was made of fine colloidal silica abrasive gains (average grain size being 5 to 80 nm) which were finer than the cerium oxide abrasive grains used in the first polishing step.

(9) Cleaning Step

The glass substrate after chemical strengthening was dipped into a water bath kept at 20° C. to be rapidly cooled and held for about 10 minutes. Then, in order to confirm the effect of removing iron oxides by an oxalic acid chemical solution, the glass substrate after the final polishing step was dipped for 24 hours into an aqueous solution containing oxides of a plurality of kinds of metals (Fe, Ni, Cr, Cu, Zn) dispersed and partially dissolved therein. Thus, artificially-contaminated substrates were prepared. For the artificially-contaminated substrates, an initial count of foreign matters before the cleaning step was about 10,000 on average.

The artificially-contaminated substrates were dipped in cleaning liquids of various conditions shown in Table 1 to be cleaned. The processing time was 3 minutes and the processing temperature was 50° C. Then, each glass substrate after cleaning was successively dipped into respective cleaning baths of pure water and IPA to be cleaned. Thereafter, the glass substrate was dried.

In Examples 1-17 and Comparative Example 1 shown in Table 1 below, cleaning was performed under the conditions described in the foregoing embodiment while carrying out ultraviolet irradiation of the cleaning liquid as described in the foregoing embodiment. The ultraviolet ray used in irradiation had a wavelength of 365 nm. In Example 16, the cleaning liquid had a pH smaller than 1.8. In Example 17, the cleaning liquid had a pH exceeding 4.2. In Comparative Example 1, a substance supplying bivalent iron ions was not used. In Comparative Example 1, the cleaning liquid does not contain iron ions and, therefore, no effect is obtained by ultraviolet irradiation. Each of Examples 1-17 and Comparative Example 1 was executed under an artificially-contaminated condition. The results of Examples 1-17 and Comparative Example 1 shown in Table 1 were obtained at a first batch.

TABLE 2

|  | wavelength of irradiation light | number of defects |
|---|---|---|
| Example 18 | 365 nm | 157 |
| Example 19 | 365 nm | 148 |
| Example 20 | 254 nm | 175 |
| Example 21 | 310 nm | 150 |
| Example 22 | 450 nm | 152 |
| Example 23 | 470 nm | 167 |
| Comparative Example 2 | no irradiation | 421 |

Specifically, a cleaning apparatus having the structure illustrated in FIG. 1 was used. Cleaning was continuously performed for 19 batches under the condition same as that in Example 4 (corresponding to the first batch: 150 defects), using the substrates without artificial contamination. At a twentieth batch (1 to 1.5 hour after the start of cleaning for the first batch), artificially-contaminated substrates were cleaned. Example 18 with irradiation of ultraviolet ray (having a wavelength of 365 nm) and Comparative Example 2 without irradiation were executed.

In Example 18 and Comparative Example 2, the surface roughness was equivalent to that in Example 4. However, the number of defects was equal to 157 in Example 18 and 421 in Comparative Example 412. Thus, the number of defects was considerably increased in Comparative Example 2. This shows that, in Example 18, the cleaning ability was maintained because the cleaning liquid was regenerated by photoreduction using ultraviolet irradiation. In Example 18, the number of defects was slightly increased as compared with Example 4. Presumably, this is because decomposition of the oxalic acid also occurred due to ultraviolet irradiation so that the amount of formation of the iron complex is slightly reduced.

TABLE 1

|  | concentration of oxalic acid (mol/L) | additive capable of forming bivalent iron ions and concentration (mol/L) | | pH | surface roughness Ra (nm) | number of defects | number of iron defects among 20 defects | DFH protruding test |
|---|---|---|---|---|---|---|---|---|
| Example 1 | 0.016 | ammonium iron sulfate | 0.00051 | 2.2 | 0.19 | 235 | 1 or less | ○ |
| Example 2 | 0.040 | iron sulfate | 0.00054 | 2.2 | 0.18 | 190 | 1 or less | ○ |
| Example 3 | 0.087 | ammonium iron sulfate | 0.0026 | 2.2 | 0.20 | 165 | 1 or less | ○ |
| Example 4 | 0.045 | ammonium iron sulfate | 0.0065 | 2.2 | 0.20 | 150 | 1 or less | ○ |
| Example 5 | 0.222 | ammonium iron sulfate | 0.00051 | 2.2 | 0.18 | 155 | 1 or less | ○ |
| Example 6 | 0.016 | iron sulfate | 0.0018 | 3.9 | 0.18 | 235 | 1 or less | ○ |
| Example 7 | 0.079 | iron sulfate | 0.0018 | 3.9 | 0.16 | 225 | 1 or less | ○ |
| Example 8 | 0.087 | ammonium iron sulfate | 0.0026 | 3.9 | 0.16 | 220 | 1 or less | ○ |
| Example 9 | 0.045 | ammonium iron sulfate | 0.0089 | 2.2 | 0.19 | 150 | 1 or less | ○ |
| Example 10 | 0.278 | ammonium iron sulfate | 0.00051 | 2.2 | 0.20 | 155 | 1 or less | ○ |
| Example 11 | 0.040 | ammonium iron sulfate | 0.0015 | 1.8 | 0.20 | 100 | 1 or less | ○ |
| Example 12 | 0.009 | iron sulfate | 0.0036 | 2.2 | 0.18 | 220 | 1 or less | ○ |
| Example 13 | 0.009 | iron sulfate | 0.0029 | 3.9 | 0.17 | 230 | 1 or less | ○ |
| Example 14 | 0.040 | iron sulfate | 0.0029 | 4.2 | 0.17 | 225 | 1 or less | ○ |
| Example 15 | 0.020 | ammonium iron sulfate | 0.0064 | 2.2 | 0.20 | 160 | 1 or less | ○ |
| Example 16 | 0.045 | ammonium iron sulfate | 0.0064 | 2.2 | 0.20 | 170 | 1 or less | ○ |
| Comparative Example 1 | 0.040 | | 0 | 2.2 | 0.21 | 460 | two or more | Δ |
| Comparative Example 2 | 0.040 | ammonium iron sulfate | 0.0015 | 1.7 | 0.35 | 95 | 1 or less | Δ |
| Comparative Example 3 | 0.040 | iron sulfate | 0.0029 | 4.3 | 0.17 | 375 | two or more | Δ |

Next, it was confirmed that, by ultraviolet irradiation of the cleaning liquid, the cleaning effect was sufficiently maintained. In other words, it was confirmed that, in case where ultraviolet irradiation was not performed, the cleaning effect was not maintained and the cleaning liquid was deteriorated at an early stage. The result is shown in Table 2.

Then, in the manner similar to Example 18 except that 0.04 mol/% of malic acid was added, continuous cleaning was performed and the result at the twentieth batch was examined in Example 19.

In Example 19, the surface roughness was not changed and the number of defects was equal to 148. Thus, the result was equivalent to that in Example 4. Presumably, this is because the iron(II) complex was regenerated by ultraviolet irradiation and decomposition of the oxalic acid due to ultraviolet irradiation was suppressed by the malic acid so that the cleaning ability was maintained at a very high level.

Furthermore, as Examples 20 to 23, experiments were performed under the condition of Example 19 except that the wavelength of the irradiation light was changed, and the result at the twentieth batch was confirmed. Herein, the wavelength of light represents an approximate peak position in spectral characteristics.

The wavelength of the irradiation light was 254 nm (Example 20), 310 nm (Example 21), 450 nm (Example 22), and 470 nm (Example 23) and the results were compared. Then, the number of defects was 175, 150, 152, and 167, respectively, each of which is a level causing no problem. The surface roughness was not changed.

In Example 20 (irradiation light having a wavelength of 254 nm), the number of defects was slightly increased. Presumably, this is because light energy was excessively strong so that the amount of decomposition of the oxalic acid was increased. In Example 23 (irradiation light having a wavelength of 470 nm), the number of defects was slightly increased. Presumably, this is because deviation from a wavelength region causing photoreduction of the iron complex is increased.

For Examples 18 to 23 and Comparative Example 2, magnetic disk glass substrates were manufactured under the conditions without artificial contamination and various layers were formed thereon to produce magnetic disks. Thereafter, a DFH touchdown test was performed. The result was excellent in each case.

[Defect Evaluation Method]

The glass substrates obtained in Examples and Comparative Examples were subjected to defect inspection by an optical defect inspection apparatus (manufactured by KLA-Tencor, trade name: OSA6100). In this event, an area of 15 mm to 31.5 mm from the center of the glass substrate was measured under measurement conditions that a laser power was 25 mW, a laser wavelength was 405 nm, and a laser spot size was 5 μm. Table 1 shows the number of firmly adhered defects (per 24 $cm^2$) among detected defects having a size not greater than 1.0 μm. The number of defects was measured, with reference to those defects present on the surface of the glass substrate before the cleaning step, by counting the number of defects remaining at the same positions after the cleaning step. The defects in Examples refer to metal-based foreign matters (more specifically, fine particles) adhered to the surface of the glass substrate. Furthermore, 20 defects were randomly picked up from the remaining defects and analyzed by using SEM/EDX (Scanning Electron Microscope/Energy Dispersive X-ray Detector) to detect adhered residual substances. Thus, the number of iron-based defects was measured.

[Evaluation after Cleaning by Acidic Cleaning Liquid]

[Method of Performing Surface Measurement of Glass Substrate]

The glass substrates obtained in Examples and Comparative Examples were measured by using an atomic force microscope, NANOSCOPE manufactured by Japan Veeco, at a resolution of 256×256 pixels per 2 μm×2 μm square to obtain a surface roughness (arithmetic mean roughness (Ra)).

Referring to Table 1, by using, as the cleaning liquid for the glass substrate, a cleaning liquid containing an oxalic acid and bivalent iron ions added thereto, the number of foreign matters firmly adhered to the glass substrate could be reduced as compared with the case where a cleaning liquid containing an oxalic acid without bivalent iron ions added thereto was used (comparison between Comparative Example 1 and each Example). In particular, the number of iron-based defects could effectively be reduced.

By adjusting the pH of the cleaning liquid containing the oxalic acid and the bivalent iron ions to 1.8 or more, the surface roughness of the glass substrate was reduced. In addition, by adjusting the pH to 4.2 or less, the number of foreign matters firmly adhered to the glass substrate could effectively be reduced (comparison between Examples 16 and 17 and the other Examples).

When the concentration of the oxalic acid was not smaller than 0.015 mol/L, the number of defects could effectively be reduced (each Example). In addition, when the concentration of the oxalic acid was 0.24 mol/L or more, the effect of removing iron oxide particles was not substantially changed (Example 10). Similarly, when the concentration of ammonium iron (II) sulfate in the cleaning liquid was 0.0077 mol/L or more, the effect of removing the iron oxide particles was not substantially changed (Example 9).

From the above-mentioned results, it has been confirmed that, by using the cleaning liquid containing the oxalic acid and the bivalent iron ions added thereto, the metal contaminants (in particular, iron-based contaminants) could effectively be removed without affecting the surface of the glass substrate.

In this invention, the concentrations of the oxalic acid and so on are defined by mol/L. Alternatively, the concentrations may be represented by wt %. For example, the concentration of the oxalic acid is not smaller than 0.19 wt % and not greater than 3.0 wt %, assuming that oxalic dihydrate (molecular weight: 126.07 g/mol) is used.

Similarly, the concentration of ammonium iron (II) sulfate is not smaller than 0.015 wt % and not greater than 0.30 wt %, assuming that ammonium iron (II) sulfate hexahydrate (molecular weight: 392.14 g/mol) is used.

The concentration of iron (II) sulfate is not smaller than 0.011 wt % and not greater than 0.21 wt %, assuming that iron (II) sulfate heptahydrate (molecular weight: 278.01 g/mol) is used.

[Method of Performing DFH Touch Down Test]

Next, magnetic disks were prepared by using glass substrates subjected to the cleaning step under the conditions of Examples and Comparative Examples mentioned above without providing new artificial contamination. The magnetic disks were subjected to a touchdown test for a DFH head device portion by using a HDF tester (Head/Disk Flyability Tester) manufactured by Kubota Comps Corporation. In this test, the device portion is gradually protruded by a DFH mechanism. By using an AE (Acoustic Emission) sensor, contact between the device portion and the surface of the magnetic disk is detected. Thus, a distance when the head device portion is brought into contact with the surface of the magnetic disk is evaluated. As a head, use was made of a DFH head for a 320 GB/P magnetic disk (2.5 inch size). When the device portion is not protruded, the flying height is 10 nm. Other conditions were set as follows:

Magnetic Disk: A 2.5-inch glass substrate (inner diameter: 20 mm, outer diameter: 65 mm, thickness: 0.8 mm) was manufactured and a recording layer and other layers were formed on the glass substrate.

Evaluation Radius: 22 mm

Rotation Speed of Magnetic Disk: 5400 RPM

Temperature: 25° C.

Humidity: 60%

The recording layer and other layers were formed on the glass substrate in the following manner. At first, by using a film-forming apparatus evacuated into vacuum, an adhesion layer, a soft magnetic layer, a pre-under layer, an under layer, a main recording layer, an auxiliary recording layer, a protection layer, and a lubrication layer were successively formed in an Ar atmosphere by DC magnetron sputtering. It is noted here that an Ar gas pressure during film formation was 0.6 Pa unless otherwise specified. As the adhesion layer, Cr-50Ti was deposited to a thickness of 10 nm. As the soft magnetic layer, 92Co-3Ta-5Zr was deposited to a thickness of 20 nm on both sides of an Ru layer of 0.7 nm. As the pre-under layer, Ni-5W was deposited to a thickness of 8 nm. As the under layer, Ru was deposited to a thickness of 10 nm at 0.6 Pa and then Ru was deposited thereon to a thickness of 10 nm at 5 Pa. As the main recording layer, 90(72Co-10Cr-18Pt)-5($SiO_2$)-5 ($TiO_2$) was deposited to a thickness of 15 nm at 3 Pa. As the auxiliary recording layer, 62Co-18Cr-15P5-5B was deposited to a thickness of 6 nm. As the protection layer, $C_2H_4$ was deposited to a thickness of 4 nm by CVD and a surface layer was nitrided. As the lubrication layer, PFPE was deposited to a thickness of 1 nm by dip coating.

The result of the DFH touchdown test is shown in Table 1. In Table 1, evaluation was made as follows depending on the distance (x) when the head device portion is brought into contact with the magnetic disk.

o: x≤1.0 nm
Δ: 1.0 nm<x

In case where the glass substrates (without artificial contamination) obtained under the cleaning conditions of Examples 1 to 15 and 18 to 23 and Comparative Example 2 were used, the distance when the head device portion was brought into contact with the magnetic disk was reduced to 1.0 nm or less. On the other hand, in case where the glass substrates (without artificial contamination) obtained under the cleaning conditions of Examples 16 and 17 and Comparative Example 1, the distance when the head device portion was brought into contact with the magnetic disk was greater than 1.0 nm. It is understood that there was an influence of the surface roughness of the glass substrate or the number of defects. From the above-mentioned result, it has been confirmed that, by manufacturing a magnetic disk using a glass substrate cleaned by a cleaning liquid containing an oxalic acid and bivalent iron ions added thereto, the distance when the head device portion is brought into contact with the magnetic disk could be reduced.

This invention is not limited to the above-mentioned embodiment but may appropriately be modified and embodied. For example, the materials, the sizes, the order of the operations, the inspection methods in the embodiment are no more than illustrative examples but may variously be modified and embodied within a range exhibiting the effect of this invention. In other respects also, this invention may appropriately be modified and embodied as far as the modification is not deviated from the scope of this invention.

This invention is applicable to a method of manufacturing a glass substrate for a magnetic disk for use as a recording medium of a computer and the like, and to a method of manufacturing a magnetic disk.

What is claimed is:

1. A method of manufacturing a magnetic disk glass substrate, comprising:
   a polishing step of polishing a main surface of a glass substrate; and
   a cleaning step of cleaning the glass substrate after the polishing step, wherein:
   in the cleaning step, the cleaning is performed under an acidic condition using a cleaning liquid containing oxalate ions and bivalent iron ions,
   the cleaning step including an operation of reducing the cleaning liquid.

2. The method according to claim 1, wherein the operation of reducing the cleaning liquid is light irradiation of the cleaning liquid.

3. The method according to claim 1, wherein the polishing step is carried out by using a polishing apparatus having a polishing surface plate containing iron, and
   the cleaning step dissolves iron-based foreign matters.

4. The method according to claim 1, wherein the cleaning liquid further contains an organic acid having a carboxyl group.

5. The method according to claim 4, wherein the organic acid is a carboxylic acid having a molecular weight greater than a molecular weight of an oxalic acid.

6. The method according to claim 1, wherein the cleaning liquid has a pH not smaller than 1.8 and not greater than 4.2.

7. The method according to claim 1, wherein a concentration of an oxalic acid in the cleaning liquid is not smaller than 0.015 mol/L and not greater than 0.24 mol/L.

8. The method according to claim 1, wherein the bivalent iron ions contained in the cleaning liquid are supplied from at least one of ammonium iron (II) sulfate, iron (II) sulfate, and iron (II) oxalate as a bivalent ion supplying substance, and
   a concentration of ammonium iron (II) sulfate in the cleaning liquid is not smaller than 0.00038 mol/L and not greater than 0.0077 mol/L when the bivalent ion supplying substance is ammonium iron (II) sulfate.

9. The method according to claim 1, wherein the glass substrate after the cleaning step has a surface roughness of 0.2 nm or less.

10. A method of manufacturing a magnetic disk, comprising:
    forming at least a magnetic layer on the main surface of the magnetic disk glass substrate obtained by the method according to claim 1.

11. A method of manufacturing a magnetic disk glass substrate, comprising:
    a polishing step of polishing a main surface of a glass substrate; and
    a cleaning step of cleaning the glass substrate after the polishing step, wherein:
    in the cleaning step, the cleaning is performed under an acidic condition using a cleaning liquid containing oxalate ions and bivalent iron ions,
    the cleaning liquid being subjected to light irradiation in parallel with the cleaning step or before the cleaning step or after the cleaning step.

12. The method according to claim 11, wherein light for irradiation of the cleaning liquid is an ultraviolet ray or a visible light.

13. The method according to claim 12, wherein the ultraviolet ray or the visible light has a wavelength in a range between 300 nm and 450 nm.

14. A method of manufacturing a magnetic disk glass substrate, comprising:
    a polishing step of polishing a main surface of a glass substrate; and
    a cleaning step of cleaning the glass substrate after the polishing step, wherein:
    in the cleaning step, the cleaning is performed under an acidic condition using a cleaning liquid containing oxalate ions and bivalent iron ions,
    in parallel with the cleaning step or before the cleaning step or after the cleaning step, trivalent iron ions generated by oxidation of the bivalent iron ions contained in the cleaning liquid are reduced.

* * * * *